United States Patent
Sircar

(10) Patent No.: US 6,623,693 B1
(45) Date of Patent: *Sep. 23, 2003

(54) ALUMINUM ALLOY COMPOSITION, ARTICLE AND METHOD OF USE

(75) Inventor: Subhahish Sircar, Richmond, VA (US)

(73) Assignee: Reynolds Metals Company, Richmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/700,589

(22) PCT Filed: May 19, 1999

(86) PCT No.: PCT/US99/10447

§ 371 (c)(1),
(2), (4) Date: Nov. 17, 2000

(87) PCT Pub. No.: WO99/60323

PCT Pub. Date: Nov. 25, 1999

Related U.S. Application Data

(63) Continuation-in-part of application No. 09/081,452, filed on May 19, 1998, now Pat. No. 6,065,534.

(51) Int. Cl.[7] .............................................. C22C 21/00
(52) U.S. Cl. ..................... 420/535; 420/536; 420/553; 420/544; 420/554; 228/262.51
(58) Field of Search ................................ 420/535, 536, 420/553, 554, 544; 228/262.51

(56) References Cited

U.S. PATENT DOCUMENTS

| | | | |
|---|---|---|---|
| 4,005,243 A | 1/1977 | Baba et al. | |
| 4,244,756 A | 1/1981 | Tanabe et al. | |
| 4,357,397 A | 11/1982 | Baba et al. | |
| 4,471,032 A | 9/1984 | Fukuoka et al. | |
| 4,499,050 A | 2/1985 | Tong | |
| 4,617,172 A | 10/1986 | Mori | |
| 5,122,208 A | 6/1992 | Alabi | |

(List continued on next page.)

FOREIGN PATENT DOCUMENTS

| | | |
|---|---|---|
| JP | 4-103738 | 4/1992 |
| JP | 6-228695 | 8/1994 |
| JP | 7-252566 | 10/1995 |
| JP | 09-025532 A | * 1/1997 |
| JP | 09-025533 A | * 1/1997 |
| JP | 9-316578 | 12/1997 |

OTHER PUBLICATIONS

"ASM Handbook: vol. 2 Properties and Selection: Nonferrous Alloys and Sprecial–Purpose Materials", ASM International, 1990, pp 7–8, 17–21, 46, and 82–86.*

(List continued on next page.)

*Primary Examiner*—Roy King
*Assistant Examiner*—Janelle Combs Morillo
(74) *Attorney, Agent, or Firm*—Christopher W. Brody; David W. Pearce-Smith

(57) ABSTRACT

An aluminum alloy composition consists essentially of controlled amounts of iron, silicon, copper, manganese, magnesium, titanium, zinc, zirconium, and free machining elements with the balance being aluminum and incidental impurities. The alloy provides improvements in combined strength, corrosion resistance, machinability, and brazeability. A component or article made from the aluminum alloy can be machined to the right configuration and can be brazed to another component to form a high quality brazed joint. In addition, the article can withstand corrosive environments and has the necessary mechanical properties to interface with other components. The alloy is adapted for particular use as a component in a heat exchanger assembly, such as a connector block having one or more machined surfaces or passageways.

47 Claims, 1 Drawing Sheet

U.S. PATENT DOCUMENTS

| | | |
|---|---|---|
| 5,282,909 A | 2/1994 | Ara et al. |
| 5,286,445 A | 2/1994 | Kamiya |
| 5,375,760 A | 12/1994 | Doko |
| 5,511,603 A | 4/1996 | Brown et al. |
| 5,522,950 A | 6/1996 | Bartges et al. |
| 5,525,294 A | 6/1996 | Tanaka et al. |
| 5,573,608 A | 11/1996 | Miyake et al. |
| 5,580,402 A | 12/1996 | Fujita et al. |
| 5,587,029 A | 12/1996 | Sircar |
| 5,725,694 A | 3/1998 | Sircar |
| 5,744,255 A | 4/1998 | Doko et al. |
| 5,771,965 A | 6/1998 | Inaba et al. |
| 6,152,354 A * | 11/2000 | Childree .................. 228/206 |

OTHER PUBLICATIONS

Spillard, Ultralloy® 6020: A Lead Free Aluminum Alloy featuring "A" Rated Machinability, pp. 61–68, ©1998 Automotive Society of Engineers.

* cited by examiner

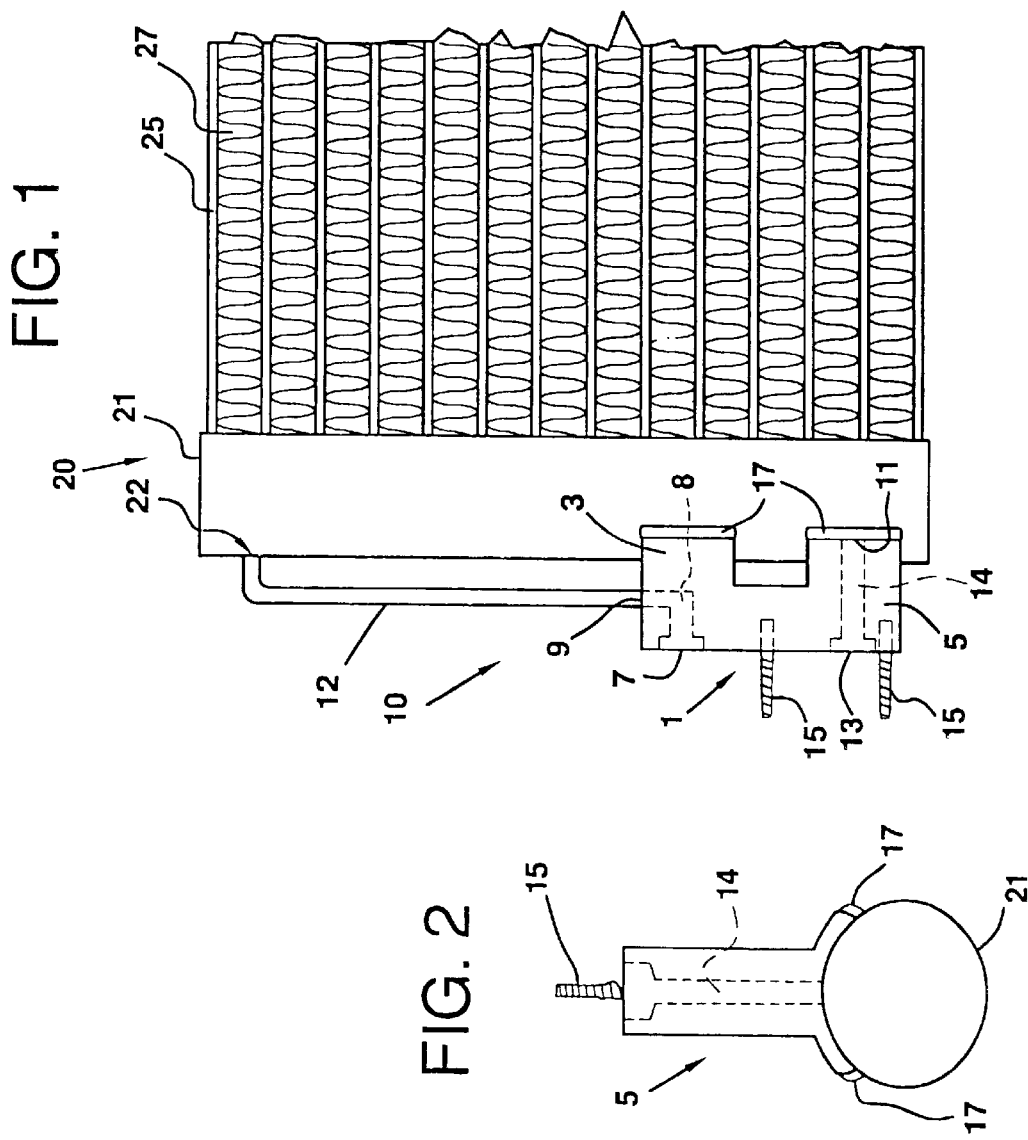

ALUMINUM ALLOY COMPOSITION, ARTICLE AND METHOD OF USE

CROSS REFERENCE TO RELATED APPLICATIONS

This application is a 37 National Stage of PCT/US99/10447 filed May 19, 1999, which is a continuation-in-part of application Ser. No. 09/081,452 filed May 19, 1998 now U.S. Pat. No. 6,065,534.

FIELD OF THE INVENTION

The present invention is directed to an aluminum alloy composition, an article made from the composition and a method of use and, in particular, to a composition which combines the properties of machinability, brazeability, corrosion resistance and strength.

BACKGROUND ART

In the prior art, the use of aluminum alloy compositions in heat exchanger applications is well known. Aluminum alloys are used for heat exchanger headers, tubing, fins and connector blocks. Typically, the connector blocks are brazed to the header to facilitate the hookup of fluid supply and takeaway lines of a system requiring fluid cooling, e.g., an air conditioning system.

When manufacturing the heat exchanger assemblies, the components are often clamped together and furnace brazed using either clad materials, filler brazing materials or a combination of both.

One significant problem that occurs during the manufacturing of the assembly is the formation of an inferior brazing joint between the connector block and the heat exchanger header. Prior to brazing, the connector blocks are often machined and combined with fasteners to facilitate connection to the fluid supply or takeaway lines. Because of the physical property requirements associated with the machining and the fastener use, prior art connector blocks are usually made from AA6000 series aluminum alloys. These types of aluminum alloys exhibit poor machinability and are not easily brazed due to their high magnesium content, especially in a controlled atmosphere brazing process. Consequently, it is often difficult to obtain a high quality brazed joint between the connector block and another component of a heat exchanger assembly. Utilizing a more brazeable alloy such as a standard or commercial AA3000 series alloy does not present an acceptable alternative as a material for connector block use. The AA3000 series alloys, while being brazeable, are generally too soft to adequately machine or have the necessary mechanical properties to facilitate mechanically fastening the connector block to other components.

As such, a need has developed to provide an improved composition for heat exchanger application or other uses where machinability, brazeability, strength and corrosion resistance are required. In response to this need, the present invention provides an improved aluminum alloy composition and an article made therefrom which combines machinability, strength, corrosion resistance and brazeability. The inventive aluminum alloy article has the required mechanical properties making it especially suitable for use as a heat exchanger component. The aluminum alloy composition and article also facilitate brazing processes when assembling the inventive article with other components.

SUMMARY OF THE INVENTION

Accordingly, it is a first object of the present invention to provide an aluminum alloy composition exhibiting machinability and brazeability.

Another object of the present invention is to provide an aluminum alloy composition having good corrosion resistance and mechanical properties.

One other object of the present invention is to provide an aluminum alloy article made from the inventive composition.

A still further object of the present invention is to provide a method of brazing the aluminum alloy article.

Other objects and advantages of the present invention will become apparent as a description thereof proceeds.

In satisfaction of the foregoing objects and advantages, the present invention provides an aluminum alloy composition consisting essentially of, in weight percent, up to about 0.6% silicon, up to about 1.2% iron, up to about 0.7% copper, between about 0.1 and 1.8% manganese, up to about 1.5% magnesium, up to about 0.4% chromium, up to about 0.4% zinc, up to about 0.2% zirconium, between about 0.03 and 0.4% titanium, and at least one free machining element selected from the group consisting of bismuth, indium and tin or a compound thereof, wherein each of the bismuth and tin are up to about 1.5% and the indium ranges between about 0.05 and 0.5%, with the balance being aluminum and incidental impurities.

The alloy composition has more preferred limits wherein the silicon is up to about 0.2%, the iron is up to about 0.7%, the copper is up to about 0.5%, the manganese ranges between about 0.2 and 1.7%, the magnesium is up to about 0.8%, the chromium is up to about 0.2%, the zinc is up to about 0.25%, and the titanium ranges between about 0.03 and 0.3%. The ranges of the at least one free machining element are further defined wherein tin and bismuth are each up to about 1.3% and the indium ranges between about 0.05 and 0.3%.

In another embodiment, the silicon ranges between about 0.03 and 0.12%, the iron ranges between about 0.03 and 0.4%, the copper ranges between about 0.01 and 0.5%, the manganese ranges between about 0.5 and 1.6%, the magnesium is up to about 0.7%, the chromium is up to about 0.1%, and the titanium ranges between about 0.03 and 0.2%. The ranges of the at least one free machining element are further defined wherein tin and bismuth are each up to about 1.0% and the indium ranges between about 0.05 and 0.2%. Other embodiments are described below.

In yet another embodiment, the alloy composition has limits wherein the silicon ranges between 0.01 and 0.15%, the iron ranges between 0.01 and 0.5%, the copper, ranges between 0.01 and 0.4%, the manganese ranges between 0.2 and 1.7%, the magnesium is from zero up to 0.4%, an amount of chromium is up to 0.2%, an amount of zinc is up to 0.25%, an amount of zirconium is up to 0.3%, titanium ranges between 0.03 and 0.3%, and an amount of at least one of tin and bismuth is up to 1.3%.

The invention also includes an article made from the inventive alloy composition. A preferred article is one that is machined and brazed. An example of such an article is a heat exchanger component which includes at least one machined portion such as a passageway, recess, seat, threaded portion or the like, e.g., a heat exchanger connector block. The component can include more than one passageway or machined portion and fasteners secured thereto to facilitate connecting the component to other components or structure.

The invention also comprises the article in combination with another component, for example, a connector block and a heat exchanger assembly wherein the assembly has cooling tubes, fins, headers and fluid supply and takeaway lines.

A further aspect of the invention includes an improved brazing process wherein the inventive article is brazed using a flux. The article permits effective brazing with minimal amounts of flux.

BRIEF DESCRIPTION OF THE DRAWINGS

Reference is now made to the drawings of the invention wherein:

FIG. 1 is a partial schematic drawing showing a heat exchanger assembly with an exemplary connector block made from the inventive composition;

FIG. 2 is an end view of the assembly of FIG. 1; and

FIG. 3 shows another embodiment of the inventive article.

DESCRIPTION OF THE PREFERRED EMBODIMENTS

The present invention offers significant improvements in the field of aluminum alloys compositions and articles made therefrom such as heat exchangers components, heat exchanger assemblies and brazing methods. The invention overcomes the dilemma facing engineers and designers when seeking an aluminum alloy composition for a particular application that requires a combination of machinability, strength, corrosion resistance and brazeability.

The aluminum alloy of the invention is ideally suited as an article for use in an application requiring strength, brazeability, machinability and corrosion resistance. One particular application for the inventive alloy is a heat exchanger component that is machined, brazed, subjected to corrosive environments and subjected to mechanical forces for mechanical attachment to other heat exchanger components. One component particularly adapted as the inventive aluminum alloy article is a connector block that links the inlet and outlet of a heat exchanger to cooling fluid supply and takeaway lines. These connector blocks are often extruded shapes and require machining operations to form one or more passageways therein as well as other recesses or configurations in the connector block body like o-ring seals and seats with good surface finish to prevent leakage. Although the connector blocks can be extruded, they could also be forged or subjected to other forms of hot deformation to form the desired shape.

Having the combined properties of machinability, brazeability, strength and corrosion resistance in an aluminum alloy composition and an article made therefrom is unexpected when compared with known prior art alloys exhibiting only some of the desired properties. For example, machinable alloys such as AA6262 have poor brazeability. Brazeable alloys such as standard or commercial AA3000 series alloys do not have the strength nor machinability for use as an article that is machined, brazed and subjected to mechanical forces such as torques.

The properties of machinability, brazeability, strength and corrosion resistance are related to the controlled compositional limits of the inventive aluminum alloy and its article form. In one aspect, the alloy has controlled amounts of iron, silicon, copper, manganese, chromium, zinc and titanium. The term "amount" is intended to mean a finite amount of the named alloying element in a specified percentage which is deemed to be greater than percentages normally classified as incidental impurities in aluminum alloys. Another aspect of the alloy composition includes controlled levels of magnesium wherein the alloy may be either magnesium-free or may include a defined magnesium amount. In yet another aspect, at least one of bismuth, indium and tin are included in amounts effective to provide the enhanced machinability without the loss of other properties, particularly mechanical properties. Zirconium is added for strength and corrosion resistance. Ranges of the various elements are detailed below in terms of broad and more narrow limits.

In its broadest embodiment, the inventive aluminum alloy consists essentially of, in weight percent, of the following composition: up to about 0.6% silicon; up to about 1.2% iron; up to about 0.7% copper; between about 0.1 and 1.8% manganese; up to about 1.5% magnesium; up to about 0.4% chromium; up to about 0.4% zinc; up to about 0.2% zirconium; between about 0.03 and 0.4% titanium; and one or more free machining elements set forth in an amount effective to improve machinability of the alloy with the balance being aluminum and incidental impurities. The free machining elements can be selected from the group consisting of tin, indium and bismuth and compounds thereof. The tin and bismuth can each range up to about 1.5% and the indium can range between about 0.05 and 0.5%. Unless otherwise noted, all percentages listed below are in weight percent.

A preferred embodiment of the inventive alloy further defines certain elements wherein the silicon is up to about 0.2%, the iron is up to about 0.7%, the copper is up to about 0.5%, the manganese ranges between about 0.2 and 1.7%, the magnesium is up to about 0.8%, the chromium is up to about 0.2%, the zinc is up to about 0.25%, and the titanium ranges between about 0.03 and 0.3%. The at least one free machining element ranges are further defined as up to about 1.3% for the tin and bismuth and between about 0.05 and 0.3% for indium.

In a more preferred embodiment of the invention, the silicon ranges between about 0.03 and 0.12%, the iron ranges between about 0.03 and 0.4%, the copper ranges between about 0.01 and 0.5%, the manganese ranges between about 0.5 and 1.6%, the magnesium is up to about 0.7%, the chromium is up to about 0.1%, and the titanium ranges between about 0.03 and 0.2%. The at least one free machining element ranges are further defined as up to about 1.0% for the tin and bismuth and between about 0.05 and 0.2% for indium.

An even more preferred embodiment defines the alloy wherein the silicon is between about 0.03 and 0.09%, the iron is up to about 0.15%, the copper ranges between about 0.1 and 0.4%, the manganese is between about 1.0 and 1.6%, the magnesium ranges from an essentially magnesium free composition, i.e., less than 0.01%, to up to about 0.3%, the titanium ranges between about 0.1 and 0.2%, and the tin is up to about 0.75%.

In another embodiment, the inventive aluminum alloy consists essentially of a finite amount of silicon up to about 0.2%, a finite amount of iron up to about 0.7%, and a finite amount of copper up to about 0.5%.

A further embodiment of the inventive alloy further defines certain elements of the composition wherein the silicon ranges between about 0.01 and 0.15%, the iron ranges between about 0.01 and 0.5%, the copper ranges between about 0.01 and 0.4%, and the magnesium is from zero to up to 0.4%.

In yet another embodiment of the invention, the copper ranges between 0.03 and 0.4%, and the magnesium is from zero to up to 0.35%.

One other embodiment defines the alloy wherein the iron ranges between 0.03 and 0.15%, and the copper ranges between 0.2 and 0.4. It should be understood that ranges or limits of one embodiment may be combined with or substituted for other embodiment amounts. More specific embodiments are identified in Table I wherein the ALLOYS include the listed elements with the balance being aluminum and incidental impurities.

TABLE I

| ALLOY | Si | Fe | Cu | Mn | Mg | Cr | Ni | Zn | Ti | Bi | In | Sn | Zr |
|---|---|---|---|---|---|---|---|---|---|---|---|---|---|
| A | .16 | .60 | .09 | 1.07 | <.01 | .27 | <.01 | .03 | .04 | <.01 | <.01 | <.01 | .10 |
| B | .12 | .14 | .27 | 1.38 | .17 | .19 | <.01 | .03 | .04 | <.01 | <.01 | <.01 | .10 |
| C | .10 | .10 | .28 | 1.47 | .22 | .19 | <.01 | .03 | .05 | 1.05 | <.01 | <.01 | .10 |
| D | .10 | .10 | .29 | 1.42 | .17 | .19 | <.01 | .03 | .04 | <.01 | <.01 | .74 | .10 |
| E | .10 | .12 | .29 | 1.38 | .19 | .19 | <.01 | .03 | .04 | <.01 | .14 | .13 | .10 |
| F | .17 | .59 | .09 | 1.12 | <.01 | .27 | <.01 | .03 | .04 | <.01 | .15 | .13 | .09 |
| G | .17 | .63 | .08 | 1.17 | <.01 | .27 | <.01 | .03 | .05 | .79 | <.01 | <.01 | .10 |
| H | .16 | .61 | .09 | 1.13 | <.01 | .27 | <.01 | .03 | .04 | <.01 | <.01 | .74 | .10 |
| I | .20 | .69 | .29 | 1.53 | .08 | .20 | <.01 | .02 | .04 | <.01 | <.01 | <.01 | <.01 |
| J | .19 | .71 | .29 | 1.31 | .09 | .21 | <.01 | .02 | .04 | <.01 | .17 | .16 | <.01 |
| K | .19 | .66 | .28 | 1.36 | .08 | .17 | <.01 | .03 | .03 | .80 | <.01 | <.01 | <.01 |
| L | .20 | .65 | .29 | 1.41 | .09 | .18 | <.01 | .03 | .04 | <.01 | <.01 | .79 | <.01 |
| M | .20 | .64 | .29 | 1.40 | .10 | .17 | <.01 | .03 | .04 | .69 | <.01 | .47 | <.01 |
| N | .20 | .66 | .29 | 1.38 | .08 | .17 | <.01 | .03 | .04 | .38 | <.01 | .34 | <.01 |
| O | .06 | <0.1 | 0.3 | 1.50 | <0.01 | <0.01 | <.01 | 0.025 | .15 | 0.8 | <.01 | <.01 | .10 |
| P | .06 | <0.1 | 0.3 | 1.50 | <0.01 | <0.01 | <.01 | 0.025 | .15 | 0.47 | <.01 | 0.36 | .10 |
| Q | .06 | <0.1 | 0.3 | 1.50 | <0.01 | <0.01 | <.01 | 0.025 | .15 | <.01 | <.01 | 0.8 | .10 |

The inventive alloy is particularly useful as a connector block for use in a heat exchanger application, e.g., a condenser. The connector block is made from the inventive alloy and has at least one machined portion and further having an inlet and an outlet for the passage of fluid through the connector block and to or from the heat exchanger. The connector block can have more than one inlet and outlet or passageway depending on the particular heat exchanger design and application. For example, the connector block could have a connector block body having one inlet passageway interconnecting a source of inlet fluid and the heat exchanger, and a second outlet passageway directing fluid from an outlet of the heat exchanger to outlet tubing downstream of the connector block.

The connector block can also have threaded studs extending from the connector block body, the studs interfacing with another body or connector that is used to facilitate attachment of fluid supply and takeaway lines to the connector block or provide structural support, e.g., attach the heat exchanger to an adjacent structure.

FIGS. 1 and 2 illustrate an exemplary connector block 10 in combination with a heat exchanger 20. The heat exchanger 20 is illustrated with one header 21 (the other header not shown), cooling tubing 25 and fins 27. Although not shown, the header 21 has internal baffles to direct the fluid passing through the tubing 25 on its journey through the entire heat exchanger for the proper cooling.

The connector block 10 has a connector block body 1 divided into an inlet portion 3 and an outlet portion 5. The inlet portion 3 has an inlet opening 7 and an outlet opening 9 defining a passageway 8, the opening 9 aligned with an opening 22 in the header 21 of the heat exchanger 20 via the tubing 12. Fluid enters inlet 7, passes through the inlet portion 3 and into the header 21 via the tubing 12 for cooling.

The outlet portion 5 has an inlet 11 and an outlet 13 defining a passageway 14, the inlet 11 in communication with an opening (not shown) in the header 21. Cooled fluid exits the header 21 and passes through the outlet portion 5 by entering the inlet 11 and exiting the outlet 13 to begin another fluid cycle, e.g., a refrigeration cycle.

The connector block body 1 is shown with a pair of threaded studs 15, each stud threaded into a complementary threaded bore in the body 1. The studs are used to align and attach a mating connector (not shown) which can hook up fluid supply and takeaway lines to the connector block 10 or provide structural support, e.g., attach a condenser to an automobile body. It should be understood that other connector block configurations can be utilized with the alloy of the invention. For example, a separate connector block could be used for each inlet to the header and the header outlet. The connector block could be designed without the need for tubing 12 or could have different studs or other attachment devices to facilitate connector block hookup to either of the inlet or outlet tubing of a system requiring fluid cooling.

The connector block passageways 8 and 14 are formed by machining the connector block body 1. The passageways can also include lips, steps, seats, threads or other machined configurations as deemed necessary to interface with heat exchanger components or other fasteners, connectors or the like.

FIG. 3 shows another connector block configuration designated by the reference numeral 30 and having a body 31 with a machined passageway 33 therethrough. The passageway 33 has a first opening 35 and a second opening 37, the opening 37 designed to align with an opening in a header. Depending on the direction of flow of fluid through the passageway 33, one of the openings, either 35 or 37, is an inlet and the other becomes an outlet. Although passageways are depicted in FIGS. 1–3, the inventive article could be formed with one or more passageways therein by an operation other than machining, e.g., extrusion or the like. In this instance, the article may then be subjected to machining a portion thereof to meet final dimensional tolerances, finishes or the like. Again, other configurations can be utilized providing that the article is need of some degree of machining.

With reference back to FIG. 1, the connector block is shown with brazed portions 17 wherein the connector block is secured to the header 21 for a fluid-tight fit. The connector block 10 can be brazed to the heat exchanger by any known techniques, but controlled atmosphere furnace brazing is preferred. The appropriate cladding material or filler metal, e.g., an AA4000 series aluminum-silicon filler metal, can be used as part of the brazing process. Using the inventive alloy for the connector block 10 permits a low level of flux to be used during the brazing cycle, thereby reducing flux consumption and cost. For example, when brazing a prior art AA6000 series connector block to a heat exchanger, the amount of flux required can be as high as 100 to 200 g/m$^2$ of flux, wherein m$^2$ represents the area to be brazed and g is the weight in grams of flux. Even with these levels of flux, the resultant braze using prior art connector blocks can still include porosity within the brazed joint or stitching, i.e., intermittent porosity pockets where the filler metal joins the materials being brazed together.

In contrast to the undesirable brazeability of the prior art alloys commonly employed for connector blocks, the connector block of the invention is highly brazeable. Further, brazing can be successfully done, i.e., a joint without porosity, stitching or the like, using flux levels ranging up to 50 $g/m^2$ more preferably 3–20 $g/m^2$ and as low as 4 to 5 $g/m^2$. The low level of magnesium in the inventive alloy minimizes the formation of magnesium compounds such as magnesium oxide or flouride. Magnesium oxide forms during the brazing process and can be difficult to remove from the brazed area, thereby compromising the integrity of the braze. Magnesium flouride, a high melting point compound, can be formed by interaction with a flourine-containing flux, such formation also interfering with the brazing process.

The inventive alloy connector block, while having acceptable brazeability, also has the desired machinability and strength to permit the connector block to be machined and connected to various other components. The connector block is typically formed by first casting an aluminum alloy into a cast shape such as a billet. The billet is then homogenized as is known in the art to form a suitable material for extrusion, forging or other hot deformation operation. The shape is then hot deformed, for example, extruded, into an elongated workpiece. The hot deformed workpiece is cut into pieces of selected width. These pieces are then machined to form the desired passageways, contours, recesses, seats, threads or whatever other configurations are necessary so that the connector block can interface with a heat exchanger, a tubing connector or other components related thereto.

The extruded connector block should have the machinability to enable the necessary passageways and the like to be formed therein. The inventive alloy combines machinability without the loss of the necessary strength and ductility for connector block use. To demonstrate the unique properties of the connector block material, various alloy compositions were tested for machinability. The machining tests, using an AA6061 aluminum alloy as a base alloy for comparison purposes, turned one inch diameter bars downed to 0.900 inch in one pass on a lathe. Sample bars were turned on a lathe, running at 2000 RPM with a feed rate of 0.021 inches per minute and a cut depth of 0.050 inches, and using a carbide tool, for approximately 8 inches in length. A second test was conducted wherein the samples were drilled using a ¼ inch drill bit, the bit run at 2000 RPM and the same feed rate as stated above. The drilled hole extended about one inch into each sample. No chip breaker or coolant was used in either test. As can be seen from Table II, Alloys C–H and J–N all exhibited desirable machining properties, i.e., small chip or small curl-shaped machining debris. Alloys D, H and L–M showed particularly impressive machining capabilities. The alloys showing desirable machining properties also exhibited acceptable strength properties. For example, comparing Alloy B with Alloy C, Alloy C has significantly better machinability with comparable strength and elongation values. A comparison between Alloy I with Alloys J–N reveals a similar finding. These comparisons demonstrate that the alloys of the invention provide the necessary machinability without compromising the mechanical properties needed when using the alloy in a connector block application.

TABLE II

| ALLOY | UTS (KSI) | YS (KSI) | % ELONG. | Machining Debris (turning) SIZE | Machining Debris (turning) SHAPE | Machining Debris (Drilling) SIZE | Machining Debris (Drilling) SHAPE | Machining Element(s) |
|---|---|---|---|---|---|---|---|---|
| A | 22.8 | 17.3 | 33.5 | long strings | thickened | two long chips | compacted strings | none |
| B | 27.9 | 19.9 | 28.5 | long strings | thickened ragged | two long strings | strings | none |
| C | 26.4 | 19.1 | 30.0 | | | small/ medium chips | chips/ strings | Bi |
| D | 27.7 | 21.1 | 20.0 | small | single curls | small | chips | Sn |
| E | 29.3 | 22.2 | 18.0 | small | chips/curls | small | chips | Sn, In |
| F | 23.9 | 15.8 | 29.0 | small | chips | small | chips | Sn, In |
| G | 23.5 | 15.7 | 31.5 | small | chips/curls | | | Bi |
| H | 24.0 | 15.2 | 29.0 | very small | chips | very small | chips | Sn |
| I | 27.4 | 19.5 | 26.5 | long/ stringy | stringy | two long chips | compacted strings | none |
| J | 27.3 | 20.5 | 23.5 | very small | curls/chips | small | chips | Sn, In |
| K | 25.3 | 17.7 | 28.5 | small | chips with some compacting | long strings | strings | Bi |
| L | 26.2 | 17.6 | 20.0 | small | chips | very small | chips | Sn |
| M | 26.1 | 18.7 | 23.5 | small | curls | very small | chips | Sn, Bi |
| N | 26.5 | 20.5 | 25.5 | small | curls | small | chips | Sn, Bi |
| 6061 | | | | medium length curls short curls | curls | small/ medium | broken chips/some strings | |

One of the more important strength requirements for the connector block is the ability to withstand the application of a torque. In many applications, threaded studs are attached to the connector block body by threading them into complementary threaded bores. The threaded studs are then used to attach a connector block connector that may hold the fluid supply and takeaway lines together or facilitate attachment to a support member. Thus, the connector block body must be able to receive the studs without stud stripping during installation. In one application, the studs may be subjected to approximately 40–60 inch pounds of torque force during installation and must withstand approximately 200 inch pounds of force without stripping.

Alloys A and F–H were tested for torque strength to demonstrate that they had the requisite strength to meet the connector block specification outlined above. A tapped bore, i.e., 8 mm diameter×1.25 mm pitch, was formed in each alloy sample. The sample was held in a vise and threaded studs were torqued into the bore using a torque load of 48 inch pounds (5.4 Nm). No failures occurred. The torque was raised to a maximum of 200 inch pounds (22–23 Nm). No thread failure occurred, thereby showing that the inventive alloys still had the necessary strength to meet the connector block torque specifications.

The free machining elements of bismuth, indium and tin can improve machinability via three different mechanisms. First, when a free machining element is used alone, the element exists in the matrix of the alloy material as an individual dispersoid. When the material is being machined and a tool contacts a locale containing one or more of the dispersoids, the matrix material and the dispersoids flow differently with respect to each other. A mismatch of displacement occurs between the two different materials thereby causing the materials to separate from each other upon application of the machining force. This separation results in void formation. Further interaction causes coalescing of the voids which then results in material being separated from the workpiece, i.e., chip formation, during machining.

Second, when at least two free machining elements are used, e.g., bismuth and tin or tin and indium, a low melting point compound can be formed in the matrix. With this low melting point compound present in the alloy, a local increase in the alloy temperature due to machining of an article made from the alloy brings the low melting point compound to a soft or liquid state. In this state, the low melting point compound loses its strength thereby facilitating the formation of small machining debris such as one or more chips. The chips can then be easily removed from the machining area without interfering with the machining operation.

Third, since the free machining elements are relatively low melting point materials, elemental melting or softening can occur during machining. This phenomenon can occur particularly when the machining operation is severe so as to cause a significant temperature rise in the workpiece. The melting or softening of the free machining elements causes the same effect as described above for low melting point compounds to enhance machining debris removal.

The inventive alloy also exhibits corrosion resistance which is required for materials for use in heat exchanger applications as evidenced by excellent corrosion test results in SWAAT testing as described in ASTM G85 Annex 3. Even better corrosion resistance can be achieved by utilizing the inventive composition when controlling titanium levels between 0.07 and 0.3%, more preferably 0.1 and 0.2%, see Alloys O, P and Q in Table I.

The comparisons and test work described above demonstrate that the aluminum alloy article of the invention can be machined, subjected to the application of torquing forces and brazed to form part of a heat exchanger assembly. Further, the brazing operation can be performed at flux levels significantly lower than methods presently used in the prior art.

While a connector block is illustrated as one type of a heat exchanger article requiring machining, corrosion resistance, strength and brazeability, other articles or components requiring the same properties can be made with the compositions described above.

Each and every element in this application can be replaced in part or whole by another element which will functionally provide the same effect as the specifically described elements. As an example titanium in the alloy may be replaced by vanadium or hafnium or zirconium, or another element with similar properties, to provide the same functionality as titanium in improving corrosion resistance of the alloy. Similarly, indium, tin and bismuth may be replaced in part or whole by other elements which essentially provide the same functional effect.

As such, an invention has been disclosed in terms of preferred embodiments thereof which fulfill each and every one of the objects of the present invention as set forth above and provides a new and improved aluminum alloy composition and an article made therefrom and a method of brazing.

Of course, various changes, modifications and alterations from the teachings of the present invention may be contemplated by those skilled in the art without departing from the intended spirit and scope thereof. It is intended that the present invention only be limited by the terms of the appended claims.

What is claimed is:

1. A magnesium free aluminum alloy article having a machined opening therein, and having a free machining composition consisting essentially of, in weight percent, up to about 0.6% silicon, up to about 1.2% iron, up to about 0.7% copper, between about 0.1% and 1.8% manganese, up to about 0.4% chromium, up to about 0.4% zinc, up to about 0.2% zirconium, between about 0.03 and 0.4% titanium, and either bismuth alone as the one free machining element or bismuth and tin as free machining elements, wherein each of the bismuth and tin is up to about 1.5%, with the balance being aluminum and incidental impurities.

2. The article of claim 1, wherein silicon is up to 0.2%, iron is up to about 0.7%, copper is up to about 0.5%, manganese ranges between about 0.2 and 1.7%, chromium is up to about 0.2%, zinc, is up to about 0.25%, titanium ranges between about 0.03 and 0.3%, tin and bismuth are each up to about 1.3%.

3. The article of claim 2, wherein silicon ranges between 0.03 and 0.12%, iron ranges between 0.03 and 0.12%, copper ranges between about 0.1 and 0.5%, manganese ranges between about 0.5 and 1.6%, chromium is up to about 0.1%, titanium ranges between about 0.03 and 0.2%, tin and bismuth are each up to about 1.0%.

4. The article of claim 3, wherein silicon ranges between 0.03 and 0.09%, iron ranges between 0.03 and 0.15%, copper ranges between about 0.1 and 0.4%, manganese ranges between about 1.0 and 1.6%, titanium ranges between about 0.1 and 0.2%, and tin is up to about 0.75%.

5. The article of claim 1, wherein the silicon is in a finite amount up to about 0.2%, the iron is in a finite amount up to about 0.7%, and the copper is in a finite amount up to about 0.5%.

6. The article of claim 5, wherein silicon ranges between 0.01 and 0.15%, iron ranges between 0.01 and 0.5%, and copper ranges between about 0.01 and 0.4%.

7. The article of claim 5, wherein copper ranges between about 0.01 and 0.4%.

8. The article of claim 1, wherein the at least one machining element comprises bismuth and tin.

9. The article of claim 1, wherein the at least one machining element is bismuth alone.

10. The aluminum alloy article of claim 1, wherein the article is a heat exchanger component.

11. In a heat exchanger assembly having a plurality of cooling tubes interconnected between a pair of headers, adjacent cooling tube separated by fins, and at least one connector block having a machined portion therein and being brazed to one of the headers so that a passageway in the connector block is in communication with one of an inlet and an outlet of one of the headers, the improvement comprising the at least one connector block being an aluminum alloy article having a composition as in claim 1.

12. In a method of brazing an article to a substrate using a flux, the improvement comprising forming the article of the aluminum alloy composition as in claim 1.

13. The method of claim 12, wherein the flux applied is an amount of up to 50 grams of flux per square meter of area to be brazed.

14. The method of claim 13, wherein the flux amount is up to 20 g/m$^2$.

15. The method of claim 13, wherein the brazing is furnace brazing.

16. An aluminum alloy composition consisting essentially of, in weight percent, silicon between 0.03 and 0.12%, iron between 0.03 and 0.12%, copper between about 0.1 and 0.5%, manganese between 0.5 and 1.6%, up to about 0.7% magnesium, up to about 0.1% chromium, up to about 0.4% zinc, up to about 0.2% zirconium, between about 0.03 and 0.2% titanium, an amount of bismuth as the sole free machining element, the bismuth amount up to 1.0%, with the balance being aluminum and incidental impurities.

17. The composition of claim 16, wherein, zinc is up to about 0.25%.

18. The composition of claim 16, wherein silicon ranges between 0.03 and 0.09%, copper ranges between about 0.1 and 0.4%, manganese ranges between about 1.0 and 1.6%, magnesium ranges from a magnesium free state to an amount up to about 0.3%, and titanium ranges between about 0.1 and 0.2%.

19. The composition of claim 16, wherein, copper ranges between about 0.1 and 0.4%, and the magnesium is from zero to up to 0.4%.

20. The composition of claim 16, wherein the magnesium is from zero to up to 0.35%.

21. An aluminum alloy article having the composition of claim 16.

22. The aluminum alloy article of claim 21, wherein the article has a machined portion therein.

23. The aluminum alloy article of claim 22, wherein the article is a connector block for a heat exchanger assembly.

24. In a method of brazing an article to a substrate using a flux, the improvement comprising forming the article of the aluminum alloy composition of claim 16.

25. The method of claim 24, wherein the flux is applied in an amount up to 50 grams of flux per square meter of area to be brazed.

26. The method of claim 25, wherein the flux amount is up to 20 grams of flux per square meter of area to be brazed.

27. An aluminum alloy composition consisting essentially of, in weight percent, silicon between 0.03 and 0.12%, iron between 0.03 and 0.12%, copper between about 0.1 and 0.5%, manganese between 0.5 and 1.6%, up to about 0.7% magnesium, up to about 0.1% chromium, up to about 0.4% zinc, up to about 0.2% zirconium, between about 0.03 and 0.2% titanium, an amount of bismuth and tin as free machining elements, the bismuth and tin amounts each ranging up to 1.0%, with the balance being aluminum and incidental impurities.

28. The composition of claim 27, wherein zinc is up to about 0.25%.

29. The composition of claim 27, wherein silicon ranges between 0.03 and 0.09%, copper ranges between about 0.1 and 0.4%, manganese ranges between about 1.0 and 1.6%, magnesium ranges from a magnesium free state to an amount up to about 0.3%, and titanium ranges between about 0.1 and 0.2%.

30. The composition of claim 27, wherein copper ranges between about 0.1 and 0.4%, and the magnesium is from zero to up to 0.4%.

31. The composition of claim 27, wherein magnesium is from zero to up to 0.35%.

32. An aluminum alloy article having the composition of claim 27.

33. The aluminum alloy article, of claim 32 wherein the article has a machined portion therein.

34. The aluminum alloy article of claim 33, wherein the article is a connector block for a heat exchanger assembly.

35. In a method of brazing an article to a substrate using a flux, the improvement comprising forming the article of the aluminum alloy composition of claim 27.

36. The method of claim 35, wherein the flux is applied in an amount up to 50 grams of flux per square meter of area to be brazed.

37. The method of claim 36, wherein the flux amount is up to 20 grams of flux per square meter of area to be brazed.

38. An aluminum alloy article having machined opening therein and a free machining composition consisting essentially of, in weight percent, up to about 0.6% silicon, up to about 1.2% iron, up to about 0.7% copper, between about 0.1% and 1.8% manganese, up to about 1.5% magnesium, up to about 0.4% chromium, up to about 0.4% zinc, up to about 0.2% zirconium, between about 0.03 and 0.4% titanium, an amount of indium and tin as free machining elements, the indium ranging between 0.05% and 0.5%, and the tin amount ranging up to 1.5%, with the balance being aluminum and incidental impurities.

39. The machined article of claim 38, wherein silicon is up to 0.2%, iron is up to about 0.7%, copper is up to about 0.5%, manganese ranges between about 0.2 and 1.7%, magnesium is up to about 0.8%, chromium is up to about 0.2%, zinc, is up to about 0.25%, titanium ranges between about 0.03 and 0.3%, and the tin amount is up to 1.3%.

40. The machined article of claim 39, wherein silicon ranges between 0.03 and 0.12%, iron ranges between 0.03 and 0.12%, copper ranges between about 0.1 and 0.5%, manganese ranges between about 0.5 and 1.6%, magnesium is up to about 0.7%, chromium is up to about 0.1%, titanium ranges between about 0.03 and 0.2%, and the tin amount is up to 1.0%.

41. The machined article of claim 40, wherein silicon ranges between 0.03 and 0.09%, iron ranges between 0.03 and 0.15%, copper ranges between about 0.1 and 0.4%, manganese ranges between about 1.0 and 1.6%, magnesium ranges from a magnesium free state to an amount up to about 0.3%, and titanium ranges between about 0.1 and 0.2%.

42. The machined article of claim 38, wherein the silicon is more than zero and up to about 0.2%, the iron is more than zero and up to about 0.7%, and the copper is more than zero and up to about 0.5%.

43. The machined article of claim 42, wherein silicon ranges between 0.01 and 0.15%, iron ranges between 0.01 and 0.5%, copper ranges between about 0.1 and 0.4%, and the magnesium is from zero to up to 0.4%.

44. The machined article of claim 42, wherein copper ranges between about 0.01 and 0.4%, and the magnesium is from zero to up to 0.35%.

45. The machined article of claim 38, wherein titanium ranges between 0.07 and 0.3% to enhance corrosion resistance as measured using ASTM G85 Annex 3.

46. The machined article of claim 38, wherein the article is a connector block for a heat exchanger assembly.

47. In a method of machining an opening in article for use in a heat exchanger assembly, the improvement comprising machining the opening in an article having the composition of claim 38.

* * * * *